(12) United States Patent
Leblang et al.

(10) Patent No.: US 11,012,575 B1
(45) Date of Patent: May 18, 2021

(54) SELECTING MEETINGS BASED ON INPUT REQUESTS

(71) Applicant: Amazon Technologies, Inc., Seattle, WA (US)

(72) Inventors: Jonathan Alan Leblang, Menlo Park, CA (US); Gary Zhong, Milpitas, CA (US); Milo Oostergo, Issaquah, WA (US); Cassity Barrows Queen, Seattle, WA (US); Aakarsh Nair, Lynnwood, CA (US); Collin Charles Davis, Seattle, WA (US); Richard Christopher Green, Bothell, WA (US); Yu-Hsiang Cheng, Bothell, WA (US); Kevin Crews, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 15/897,761

(22) Filed: Feb. 15, 2018

(51) Int. Cl.
H04M 3/56 (2006.01)
G06Q 10/10 (2012.01)
G06F 3/16 (2006.01)
G10L 15/26 (2006.01)
G06N 3/02 (2006.01)
G06N 7/00 (2006.01)
G06N 3/04 (2006.01)
G06N 20/00 (2019.01)
(Continued)

(52) U.S. Cl.
CPC ............ H04M 3/568 (2013.01); G06F 3/167 (2013.01); G06N 3/02 (2013.01); G06N 3/0454 (2013.01); G06N 3/08 (2013.01); G06N 5/003 (2013.01); G06N 5/022 (2013.01); G06N 5/043 (2013.01); G06N 7/005 (2013.01); G06N 20/00 (2019.01); G06Q 10/00 (2013.01); G06Q 10/06311 (2013.01); G06Q 10/10 (2013.01); G06Q 10/109 (2013.01); G06Q 10/1093 (2013.01); G06Q 10/1095 (2013.01); G10L 15/26 (2013.01); H04M 3/565 (2013.01); H04M 3/567 (2013.01); H04M 2201/40 (2013.01)

(58) Field of Classification Search
CPC .......... G06N 20/00; G06N 3/08; G06N 5/022; G06N 5/043; G06N 7/005; G06N 3/02; G06N 3/0454; G06N 5/003; G06Q 10/1095; G06Q 10/1093; G06Q 10/109; G06Q 10/10; G06Q 10/00; G06Q 10/06311; H04M 3/568; H04M 3/565; H04M 3/567; H04M 2201/40; G10L 15/26; G06F 3/167
USPC ...................................... 709/204
See application file for complete search history.

(56) References Cited

U.S. PATENT DOCUMENTS

2009/0157672 A1* 6/2009 Vemuri ................. G09B 19/00
2013/0262173 A1* 10/2013 Chen ................. G06Q 10/1093
705/7.24

(Continued)

Primary Examiner — Chris Parry
Assistant Examiner — Weiwei Y Stiltner
(74) Attorney, Agent, or Firm — Lee & Hayes, P.C.

(57) ABSTRACT

Techniques for selecting a meeting to join in response to a voice command from a user are described herein. A user may utter a voice command to "join my meeting" and, in response, the techniques may access a calendar associated with the user to identify the call-in information used to join the meeting. If the calendar indicates that the user is listed as an invitee for multiple meetings at the current time, then the techniques may analyze an array of criteria to determine which meeting the user most likely would like to join.

14 Claims, 9 Drawing Sheets

(51) Int. Cl.
*G06N 5/04* (2006.01)
*G06N 5/00* (2006.01)
*G06N 3/08* (2006.01)
*G06N 5/02* (2006.01)
*G06Q 10/06* (2012.01)
*G06Q 10/00* (2012.01)

(56) References Cited

U.S. PATENT DOCUMENTS

| | | | |
|---|---|---|---|
| 2014/0108506 A1* | 4/2014 | Borzycki | H04L 67/10 709/203 |
| 2014/0372162 A1* | 12/2014 | Dhara | G06Q 10/1095 705/7.19 |
| 2015/0324754 A1* | 11/2015 | Bathiya | G06Q 10/1095 705/7.19 |
| 2016/0112572 A1* | 4/2016 | Ma | H04M 3/563 379/202.01 |
| 2016/0189112 A1* | 6/2016 | Kidron | G06Q 10/109 705/7.19 |
| 2016/0358125 A1* | 12/2016 | Bastide | G06Q 10/1095 |
| 2017/0195128 A1* | 7/2017 | Ng | H04L 12/1822 |
| 2017/0308866 A1* | 10/2017 | Dotan-Cohen | H04L 43/0876 |
| 2018/0039931 A1* | 2/2018 | Dotson | G06Q 10/063116 |
| 2018/0137470 A1* | 5/2018 | Donnelly | G06Q 10/1095 |
| 2018/0137472 A1* | 5/2018 | Gorzela | G06Q 10/1095 |
| 2018/0176270 A1* | 6/2018 | Griffin | G06F 3/167 |
| 2018/0316893 A1* | 11/2018 | Rosenberg | H04L 65/403 |
| 2018/0341925 A1* | 11/2018 | Leske | G06Q 10/1095 |
| 2019/0005462 A1* | 1/2019 | Brennan | G06Q 10/1095 |
| 2019/0019162 A1* | 1/2019 | Yang | G06Q 10/1095 |
| 2019/0199541 A1* | 6/2019 | Chukka | H04L 67/18 |

* cited by examiner

SELECTING MEETINGS BASED ON INPUT REQUESTS

BACKGROUND

Homes and offices are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. An additional way to interact with computing devices is through natural language input such as speech input and gestures. Discussed herein are technological improvements for, among other things, these computing devices and systems involving the computing devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
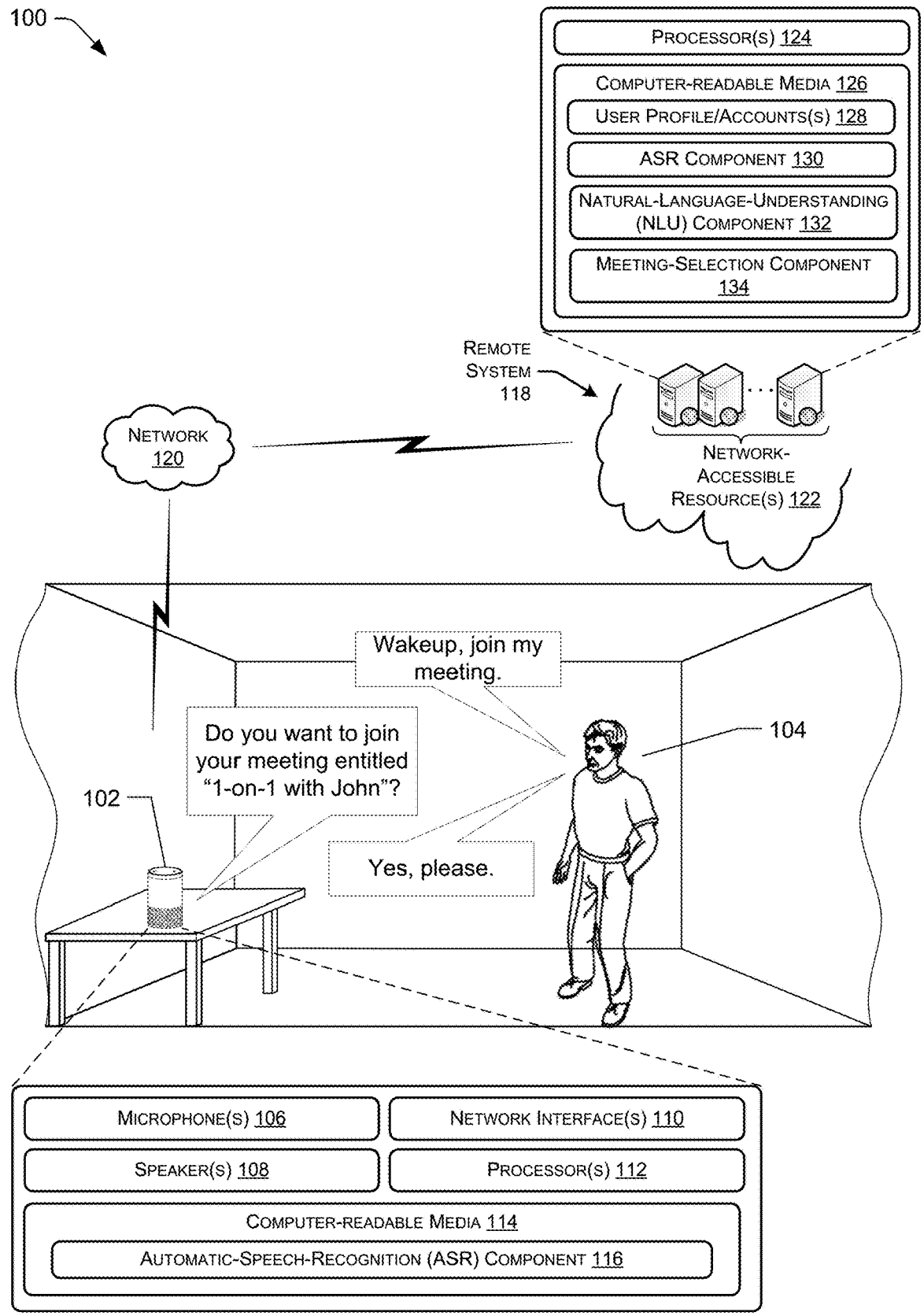
FIG. 1 illustrates a schematic diagram of an example architecture that includes a voice-controlled device and a remote system, which together are configured to receive a request from a user to join a meeting, access a calendar associated with the user, and, if the calendar indicates that the user is an invitee of multiple meetings at the time of the request, select a meeting to join. The voice-controlled device may then join the selected meeting, in some instances after requesting and receiving confirmation from the user.

This disclosure describes systems and techniques for selecting one or more meetings to join in response to a user requesting to join a meeting at a time when the user is listed as an invitee of multiple meetings. For example, a user may issue a request to join a meeting via a client computing device, such as a voice-controlled device, a laptop computer, a desktop computer, a tablet computing device, a wearable computing device, or the like. In some instances, the user may issue this request to join the meeting to the same client computing device that is to join the meeting or to another client computing device. The meeting may comprise an audio-only meeting (e.g., a phone call, a phone conference, etc.), an audiovisual meeting (e.g., a video-teleconferencing (VTC) meeting, etc.), or the like. Further, the user may issue the request via a voice command, via use of a graphical user interface (GUI), or in any other manner.

In some instances, the user utters a request to join a meeting to a voice-controlled device, which is configured to join an audio-based meeting in response to the request. In these instances, the user may utter a predefined utterance (e.g., a "wakeword") that, when detected by the voice-controlled device, causes the voice-controlled device to being sending an audio signal that includes the user's speech to a remote system. That is, the voice-controlled device may continually or periodically generate audio signals and may analyze these audio signals to identify the predefined utterance. If the voice-controlled device does not identify the predefined utterance, the voice-controlled device may delete the audio signal. If, however, the voice-controlled device identifies the predefined utterance, then the voice-controlled device may begin sending the audio signal to the remote system for further analysis. In other instances, meanwhile, the voice-controlled device may itself perform further (local) analysis on the audio signal upon identifying the predefined utterance.

Continuing the example from above, upon identifying the predefined utterance from the audio signal, the voice-controlled device may begin sending the audio signal to the remote system, which may in turn perform automatic speech recognition (ASR) on the audio signal to generate text corresponding to the speech request of the user. After generating the text, the remote system may perform natural language understanding (NLU) on the text to identify the intent of the request. After identifying the intent, the remote system may provide the text to the appropriate domain (or "speechlet") that is configured to act upon the request. In this example, the remote system may determine, using NLU, that the text corresponds to a request to join a meeting and, thus, the remote system may route the text to a component configured to do so, such as a meeting-selection component (or speechlet).

Upon receiving the text, the meeting-selection component may identify the request to join a meeting. In response, the meeting-selection component may initially attempt to identify the user and/or a profile associated with the voice-controlled device that provided the audio signal. To do so, the meeting-selection component or another component of the remote system may map a device identifier (DID) (e.g., serial number, MAC address, etc.) of the voice-controlled device to a user, may use voice-recognition to identify the user, may engage in a back-and-forth identification and/or authentication dialogue with the user, or may identify the user in any other manner. After identifying the user, the meeting-selection component may access a calendar associated with the user. That is, the user may have previously consented to allowing the remote system to gain access to one or more calendars of the user, which may be hosted by a calendaring application that is a part of the remote system or part of an unrelated third-party system. In either instance, the meeting-selection component may access the calendar and determine if the calendar indicates that the user is an invitee of one or more meetings at the time indicated by the request. For instance, if the user request is "join my meeting", then the meeting-selection component may determine whether the user is an invitee of a meeting scheduled to begin (or already in progress) at a current time or within a threshold amount of time of the current time. If the user request is "join my meeting at 2 pm" and the request is prior to 2 pm, the meeting-selection component may determine whether the user's calendar indicates that the user is an invitee of one or more meetings at 2 pm.

In either instance, the meeting-selection component may determine, in some instances, that the calendar of the user does in fact indicate that the user is an invitee of one or more meetings at the indicated time. If the calendar indicates that the user is an invitee of multiple meetings at the time, the meeting-selection component may attempt to select the appropriate meeting to join based on one or more of an array of criteria. For example, the meeting-selection component may first determine which of the multiple meetings includes, as part of the invitation data associated with the respective meeting, dial-in information for accessing the meeting. Dial-in information may include a phone number, a conference bridge, or any other type of information that the meeting-selection component may use to cause the voice-controlled device to join the respective meeting. If a single meeting of the multiple meetings of the user at the indicated time includes dial-in information, then the meeting-selection component may cause the voice-controlled device join that meeting. If, however, multiple meetings of the user at the indicated time include respective dial-in information, then the meeting-selection component may attempt to determine the appropriate meeting to join.

To make this determination, the meeting-selection component may reference one or more additional criteria. For example, the meeting-selection component may reference one or more of the following non-limiting list of example criteria:

- A number of invitees in the meeting invite for each respective meeting;
- Identitie(s) of other invitees in the meeting invite for each respective meeting (e.g., based on an organization chart of a business, a standing of an invitee in a social network, etc.);
- A number of invitees that have already joined each respective meeting;
- Previous behavior of the user in terms of joining prior instances of the same respective meetings (e.g., based on same/similar titles, invitees, topics, agenda, time, date, etc.);
- Past-participation level of the user in prior meetings that are similar to each respective meeting (e.g., based on attendance, an amount of time that the user spoke in the prior meetings, a rating of the user's prior participation by the user or by other attendees in the prior meetings, etc.). In some instances, a higher participation level may be based on attendance, a number of times speaking or participating, an amount of time speaking or participating, or the like;
- Whether the respective meetings are recurring or one-time meetings;
- Keyword(s) in the title, agenda, or the like of the respective meeting;
- Whether the user is listed as required, optional, or the like for each respective meeting;
- Whether the meeting pertains to topics of current interest to the user, as determined explicitly by the user, via analysis of recent communications or work product of the user, or the like (e.g., communications within a prior day, week, month, year, etc.);
- Whether the user sent the meeting invite for each respective meeting;
- The identity of the user that sent the meeting invite for the respective meeting;
- Whether the user accepted the invite for each respective meeting;
- The number of other invitees that have accepted, declined, or replied as tentative;
- The ratio of other invitees that have accepted, declined, or replied as tentative (e.g., relative to the total number of invitees);
- Whether the invitation for the meeting was sent directly to the recipient or via a distribution list that includes the recipient;
- Whether the user replied as tentative for each respective meeting or didn't reply at all;
- Current time of day, date, day of the week, season, etc.;
- The current status of the meeting (e.g., canceled, etc.);
- Remaining time left in a meeting (e.g., ten minutes vs. 1 hour);
- The time since the user last spoke/met with other invitees of the meeting;
- Whether the user is listed in the meeting invite as a presenter or contributor;
- Ratings or previous meetings deemed similar to each respective meeting;
- A location of the client computing device to which the user made the request; and
- Any other criteria regarding each respective meeting, the user, or other invitees of each respective meeting.

While the above list describes selecting a meeting with reference to invitees of meetings, the same and/or different criteria may be analyzed with reference to attendees of meetings. In some instances, an attendee may comprise an invitee that has accepted an invite to a respective meeting.

In some instances, the meeting-selection component may compute a score for each of the meetings scheduled to occur at the indicated time based on one or more of the above or other criteria. The meeting-selection component may then automatically cause the voice-controlled device to join the selected meeting having the highest computed score. In some instances, upon selecting a meeting to join, the meeting-selection component may generate a query for output to the user to ensure that the meeting-selection component has selected the meeting intended by the user. The meeting-selection component may then send query data to the voice-controlled device or other client computing device for output to the user. This query data may comprise audio data, video data, or the like. For example, the meeting-selection component may send query data to the voice-controlled device causing the voice-controlled device to output the audio "would you like to join your meeting entitled 'Frozen Waffle Brainstorming Session'?" The voice-controlled device may then generate an audio signal that includes speech of the user responding to the query and may send this audio signal back to the remote system. The remote system may perform ASR on this audio signal to generate response text and may route this response text to the meeting-selection component. The meeting-selection component may then analyze the response text to determine a response of the user. If the user says, for example, "yes" or otherwise confirms the desire of the user to join the meeting selected by the meeting-selection component, then the meeting-selection component may generate one or more instructions for causing the voice-controlled device to join the selected meeting and may send these instructions to the device. For example, the meeting-selection component may identify the phone number, bridge number, uniform resource locator (URL), or other dial-in information identified in the corresponding meeting invite and may provide an instruction to join the meeting via this dial-in information to the voice-controlled device. The voice-controlled device may the join the meeting based on the instructions (including the dial-in information) provided by the meeting-selection component and may begin sending data (e.g., audio data, video data, etc.) from the environment of the user to other computing device(s) that have joined the meeting and may receive and output data (e.g., audio data, video data, etc.) from the other computing device(s).

If the meeting-selection component determines, from the response text, however, that the user says "no", the meeting-selection component may generate query data that, when outputted, asks if the user would like the device to join the meeting having the second highest score, and so forth. Or, if the response data identifies a meeting that the user would like to join (e.g., "no, please join my 'monthly status update' meeting with Tim"), then the meeting-selection component may use this response data to generate instructions to cause the voice-controlled device to join the identified meeting.

In still other instances, rather than generate the query data, the meeting-selection component may automatically cause the voice-controlled device to join the meeting having the highest computed score. For example, the meeting-selection component may utilize one or more thresholds, such that the meeting-selection component automatically causes the voice-controlled device to join the meeting having the highest computed score if the score is over a threshold (or if the difference between the highest score and the second-highest score is greater than a threshold), while generating the query data if the score is less than the threshold. In still other instances, rather than issue a query to the user or automatically join the meeting on behalf of the user, the meeting-selection component may utilize the calculated scores in other ways. For example, the meeting-selection component may send, to a client computing device of the user, data for presenting on a graphical user interface (GUI) of the device. This data may emphasize those meeting(s) having the highest score for allowing the user to easily select the meeting that the meeting-selection component has determined is the "best" meeting for the user to join. For example, the data may cause the GUI to list the meeting having the highest calculated score first, in a larger manner than other meetings, or the like.

In either instance, the meeting-selection component may attempt to select the appropriate meeting for the user to join based on the time associated with the request and one or more of the criteria listed above. This intelligent determination of which meeting to cause a client computing device to join improves existing technology, in part, by allowing a user to interact via voice with a client computing device, trusting that the client computing device will behave like an intelligent assistant and will automatically make the same decision that the user would make without requiring the user to explicitly state this information.

Further, while the above example describes a user requesting to join a meeting via voice, the techniques described herein apply equally to instances where the user issues these requests via a GUI (e.g., touch, swipe gesture, point-and-click, etc.), via gestures captured by a camera, or in any other manner. For example, a user may issue a request to join a meeting by, for example, selecting a soft button depicted on a GUI of an application. In response, a meeting-selection component may perform the techniques for determine which meeting to join on behalf of the user or which meeting to suggest that the user join.

In addition, it is noted that while the user may issue a request to join a meeting via a client computing device and may participate in the meeting via the same device, in other instances the device through which the user issues the request may differ from the device(s) on which the meeting occurs. For instance, a user may issue a request to join a meeting via an application executing on a mobile device of the user, while the meeting-selection component may cause a voice-controlled device, a television, and/or another client computing device to join the meeting in addition or in the alternative to the mobile device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for utilizing techniques for selecting a meeting to join on a client computing device, such as a voice-controlled device 102, based on voice commands from a user 104. The device 102 may reside in an environment, such as a room, a house, an office, a place of business, an apartment, and/or an outdoor space. The device 102 may include components such as, for example, one or more microphones 106, one or more speakers 108, one or more network interfaces 110, one or more processors 112, and computer-readable media 114. The computer-readable media 114 of the device 102 an automatic-speech-recognition (ASR) component 116 for identifying predefined utterances, such as a wakeword that, when identified, causes the device 102 to send audio signals generated by the microphone(s) 108 to a remote system, such as remote system 118, for further analysis. In this example, where the illustrated user 102 utters the phrase "wakeup, join my meeting", the ASR component 116 is configured to identify the wakeword "wakeup" and, thus, begins sending the audio signal (e.g., including the phrase "join my meeting") to the remote system over a network 120. The network 120 may represent one or more wired or wireless networks.

As illustrated, the architecture 100 includes a remote system 118 configured to receive and send data between the remote system 118 and the device 102, for example. The remote system 118 may include components such as, for example, one or more network interfaces, one or more processors 124, and computer-readable media 126. The components of the computer-readable media 126 may include, for example, a user profile/account component 128, an ASR component 130, a natural language understanding (NLU) component 132, and one or more speechlets, such as a meeting-selection component 134.

The user profiles/accounts component 128 may be configured to identify, determine, and/or generate associations between users, user profiles, user accounts, and/or devices. For example, the user profiles/account component 128 may store an association between the voice-controlled device 102 and the user 104, potentially along with other information associated with the user. For example, the user profiles/account component 128 may store an association between the user and one or more calendar applications, and corresponding calendar data, utilized by the user 104. For example, the user profiles/accounts component 128 may store an indication of a location of one or more calendars storing information regarding appointments (or "meetings") for which the user 104 is an invitee. The component 128 may have access to these calendar(s), which may be stored by the remote system 118 or by another third-party system accessible by the remote system 118.

The ASR component 130, meanwhile, may be configured to receive audio data, which may represent human speech such as user utterances, and generate text data corresponding to the audio data. The text data may include words corresponding to the human speech. The NLU component 132 may be configured to determine one or more intents associated with the human speech based at least in part on the text data. The ASR component 130 and the NLU component 132 are described in more detail below with respect to FIG. 5.

In the illustrated example, the user 104 may speak the illustrated utterance ("wakeup, join my meeting") to the device 102. The microphones 106 of the device 102 may capture the user utterance and may generate a corresponding audio signal. The ASR component 116 residing on the voice-controlled device 102 may thereafter recognize the predefined utterance ("wakeup") and, in response, the voice-controlled device 102 may send the audio signal representing the utterance of the user to the remote system 118. Upon receiving the audio signal, the ASR component 130 may perform ASR on the audio signal to generate text, which may be provided to the NLU component 132. The NLU component 132 may determine, using NLU, that user 104 intends to join a meeting using the device 102 and, thus, the request may be routed to the meeting-selection component 134 for carrying out the request of the user.

Upon receiving the request, the meeting-selection component 134 may attempt identify the meeting to cause the device 102 to join. To do so, the meeting-selection component 134 may initially attempt to identify the device 102 and/or the user 104. For example, the meeting-selection component 134 may receive an identifier associated with the device 102 that provided the audio signal and may map this identifier to a profile of the user 104 using the user profile/ accounts component 128. Upon identifying the profile of the user 104, the meeting-selection component 134 may, again using the component 128, identify and access one or more calendars associated with the user 104.

Upon accessing the calendar(s) of the user 104, the meeting-selection component 134 may determine whether the calendar(s) indicate that the user is an invitee for one or more meetings at the current time. That is, the meeting-selection component 134 may analyze the calendar(s) to determine if the calendar(s) list a meeting invitation or other data indicating that the user is an invitee (or "participant") of a meeting at the current. If the meeting-selection component 134 determines that the user 104 is an invitee of one or more meetings, the meeting-selection component 134 may determine whether one or more of these meetings are associated with dial-in information for allowing the device 102 to join the corresponding meeting. That is, the meeting-selection component 134 may analyze invite data associated with the invitations associated with the identified meetings to identify phone numbers, URLs, access codes, and/or other information that the device 102 may use to join the corresponding meeting.

In some instances, if a single identified meeting has dial-in information, then the meeting-selection component 134 may cause the voice-controlled device 102 to join this meeting. For example, the meeting-selection component 134 may generate one or more instructions that, when executed at the device 102, cause the device 102 to join the respective meeting using the dial-information. In addition, the meeting-selection component 134 may generate, using a text-to-speech (TTS) component, audio data to be output by the device 102, such as "joining your 1 pm meeting now."

In some instances, however, if the meeting-selection component 134 identifies multiple meetings at the corresponding time (potentially with dial-in information), then the meeting-selection component 134 may attempt to determine the correct meeting join. That is, the meeting-selection component 134 may analyze one or more criteria to determine the appropriate meeting to join. In some instances, the component 134 may use the criteria to generate a corresponding score associated with each meeting and may suggest or automatically join the meeting having the highest score. As noted above, these criteria may include the following:

A number of invitees in the meeting invite for each respective meeting;

Identitie(s) of other invitees in the meeting invite for each respective meeting (e.g., based on an organization chart of a business, a standing of an invitee in a social network, etc.);

A number of invitees that have already joined each respective meeting;

Previous behavior of the user in terms of joining prior instances of the same respective meetings (e.g., based on same/similar titles, invitees, topics, agenda, time, date, etc.);

Past-participation level of the user in prior meetings that are similar to each respective meeting (e.g., based on attendance, an amount of time that the user spoke in the prior meetings, a rating of the user's prior participation by the user or by other attendees in the prior meetings, etc.). In some instances, a higher participation level may be based on attendance, a number of times speaking or participating, an amount of time speaking or participating, or the like;

Whether the respective meetings are recurring or one-time meetings;

Keyword(s) in the title, agenda, or the like of the respective meeting;

Whether the user is listed as required, optional, or the like for each respective meeting;

Whether the meeting pertains to topics of current interest to the user, as determined explicitly by the user, via analysis of recent communications or work product of the user, or the like (e.g., communications within a prior day, week, month, year, etc.);

Whether the user sent the meeting invite for each respective meeting;

The identity of the user that sent the meeting invite for the respective meeting;

Whether the user accepted the invite for each respective meeting;

The number of other invitees that have accepted, declined, or replied as tentative;

The ratio of other invitees that have accepted, declined, or replied as tentative (e.g., relative to the total number of invitees);

Whether the invitation for the meeting was sent directly to the recipient or via a distribution list that includes the recipient;

Whether the user replied as tentative for each respective meeting;

Current time of day, date, day of the week, season, etc.;
The current status of the meeting (e.g., canceled, etc.);
Remaining time left in a meeting (e.g., ten minutes vs. 1 hour);
The time since the user last spoke/met with other invitees of the meeting;
Whether the user is listed in the meeting invite as a presenter or contributor;
Ratings or previous meetings deemed similar to each respective meeting;
A location of the client computing device to which the user made the request; and
Any other criteria regarding each respective meeting, the user, or other invitees of each respective meeting.

For example, the meeting-selection component 134 may determine that one or more of the meetings are recurring meetings and may determine whether the user 104 has historically joined (or refrained from joining) the previous instances of the recurring meeting(s). In another example, the component 134 may be configured to identify certain keywords in the title or agenda, such as "1-on-1", "urgent", or the like and may increase (or decrease) the corresponding meeting's score based on these keywords. In some instances, keywords that are identified in titles, agendas, or other text associated with the meeting may be used to determine whether the user has historically joined meetings having these keywords. That is, the meeting-selection component 134 may determine participation rates in the past for meetings that include keywords such as "urgent", "out of office", or the like. As such, the meeting-selection component 134 may determine that the user has attended a large number of meetings having certain keywords in their title or agenda (e.g., "urgent", "design review", etc.) while rarely or never attending meetings having other keywords (e.g., "out of office", etc.). In some instances, this technique allows the meeting-selection component 134 to filter out meetings associated with certain keywords, such as "out of office".

In another example, the meeting-selection component 134 may perform textual analysis of each meeting's invitation data to determine if the user 104 is a presenter or significant contributor of the meeting and, if so, may increase (or decrease) a score associated with the respective meeting. Of course, while a few examples are provided, it is to be appreciated that the meeting-selection component 134 may utilize the criteria in any manner.

After computing scores for each of the meetings, the meeting-selection component 134 may select one of the meetings to join or suggest joining, such as the meeting having the corresponding highest score. As illustrated in FIG. 1, the meeting-selection component 134 may utilize a TTS engine to generate output audio data for output by the device 102 to confirm that the component 134 has selected the correct meeting. In the illustrated example, for instance, the device 102 outputs, via the speaker(s) 108, the audio "Do you want to join your meeting entitled '1-on-1 with John". The voice-controlled device 102 may then generate an audio signal based on sound captured by the microphone(s) 106 and may provide this audio data to the remote system 118, which may route information associated with this request (e.g., text data provided by the ASR component 130) to the meeting-selection component 134. In this example, the user 104 replies "Yes, please." Thus, after identifying this response, the meeting-selection component 134 may generate one or more instructions for joining the identified meeting and may provide these instructions to the device 102. These instructions may include, for instance, the dial-in information (e.g., number, access code, URL, etc.) for joining the meeting. Upon receiving the instructions, the voice-controlled device 102 may join the meeting accordingly.

In some instances, meanwhile, the user may provide a response requesting to join a different meeting, or simply indicating that he or she does not wish to join the identified meeting. In these instances, the meeting-selection component 134 may output another meeting suggestion or may generate instructions to cause the device 102 to join a meeting identified by the user in his or her response.

If no dial-in information is provided for the selected meeting, then the meeting-selection component 134 may generate output data requesting that the user provide such information. For example, the meeting-selection component 134 may generate, using a text-to-speech (TTS) engine, audio data to be output by the device, such as "Please provide the dial-in number for your 1-on-1 meeting with John". The ASR component 116 and/or the ASR component 132 may identify the response of the user and may correspondingly connect to the meeting using the provided the information.

While FIG. 1 illustrates an example where the voice-controlled device 102 joins an audio-only meeting, it is to be appreciated that the techniques may apply to audiovisual or other types of meetings. For instance, the user 104 may communicate with a client computing device that includes a display in addition to speakers, and the meeting-selection component 134 may cause the client computing device to join the audiovisual meeting. Further, while FIG. 1 illustrates the user 104 requesting via a voice command to join a meeting, in other instances the user 104 may utilize a GUI or other input means. Furthermore, while FIG. 1 illustrates that the voice-controlled device 102 both receives the requests to join the meeting and joins the meeting, in other instances the user 104 may interact may interact with a first client computing device to request to join a meeting, causing a second client computing device to alternatively or additionally join the meeting.

FIGS. 2A-2E and 3 illustrate respective processes for selecting a meeting to join in response to a user request. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIGS. 2A-2E collectively illustrate a flow diagram of an example process 200 and include, at block 202, a user issuing a request to join a meeting. In this example, the user utters a voice command to join a meeting (e.g., "Wakeup, join the meeting"), while in other instances the user may make the request using a GUI or in any other manner. At block 204, a client computing device, in this example the voice-controlled device 102, generates an audio signal based on sound captured by its microphones, with the sound including the user utterance. At block 206, the voice-controlled device 102 identifies, via ASR, the predefined utterance represented in the audio signal. In response, the voice-controlled device 102 begins uploading the audio signal to a remote system, such as the remote system 118 of FIG. 1. The remote system 18 obtains the audio signal at block 210 and, at block 212, performs ASR on the audio signal to generate text corresponding to the user's utterance. At block 214, the remote system uses NLU to identify that the utterance represents a request to join a meeting.

Figure 2A:
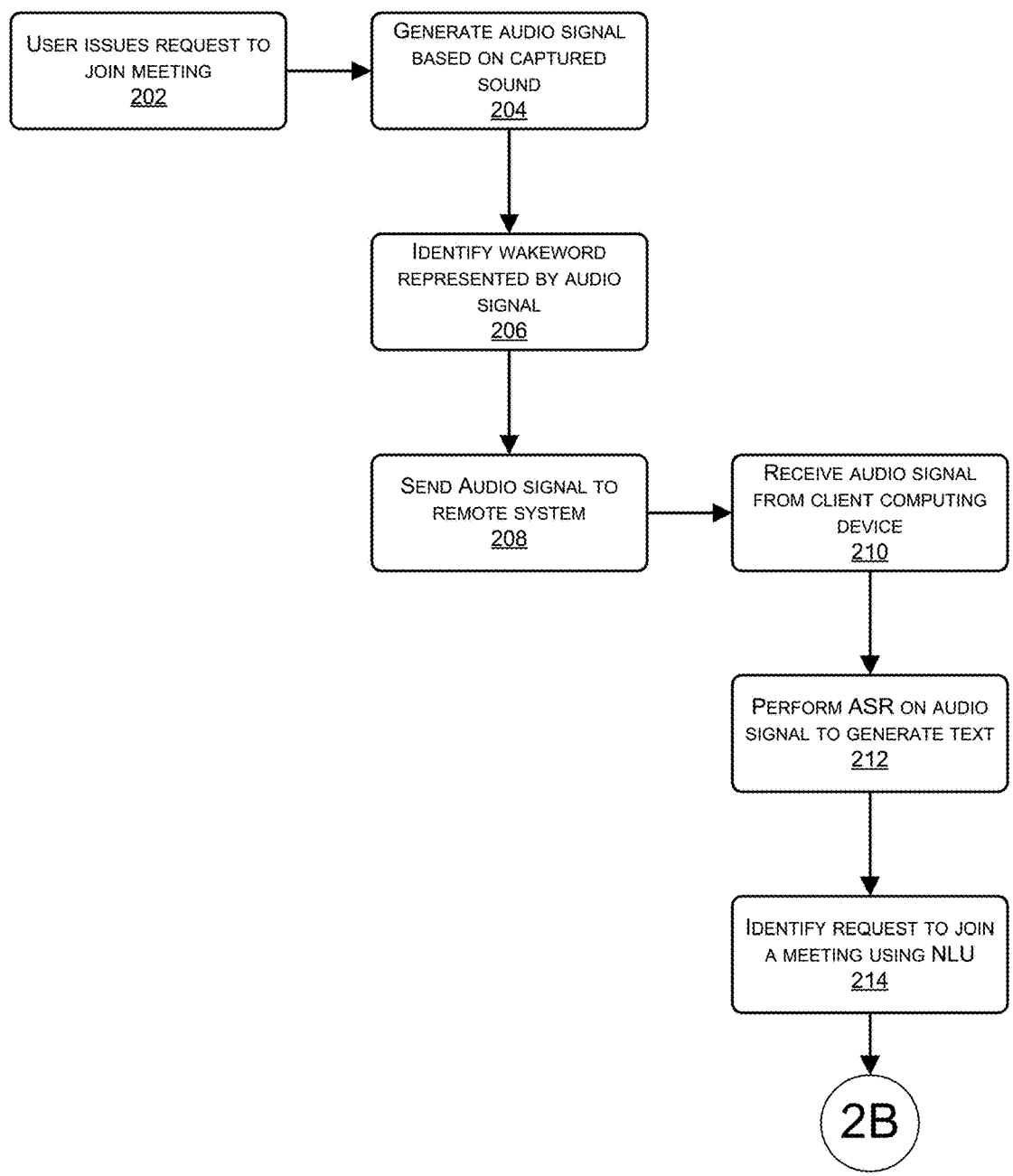
FIGS. 2A-2E collectively illustrate a flow diagram of an example process for receiving a request to join a meeting, selecting a meeting to join, and causing a client computing device to join the selected meeting.
Figure 2B:
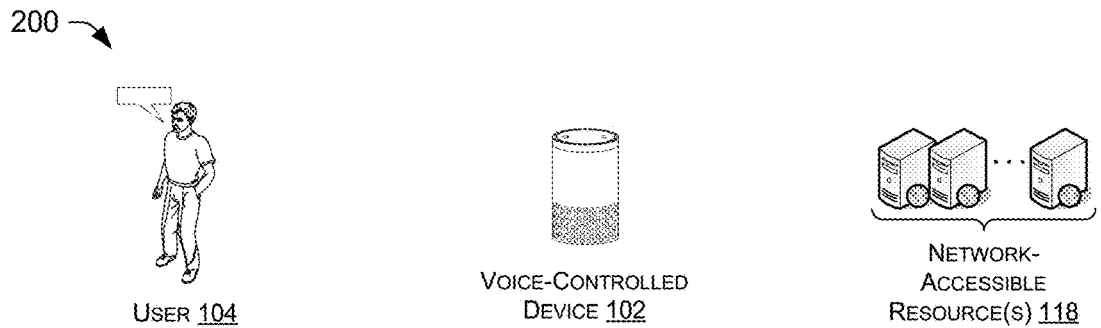
Figure 2B:
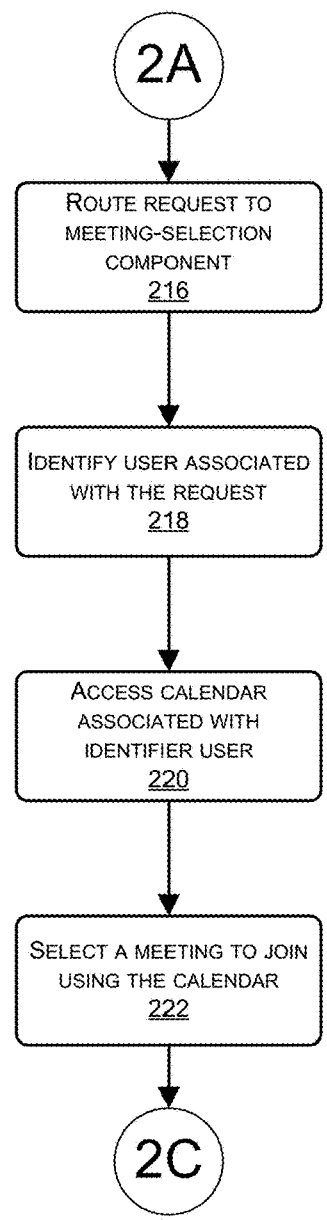

FIG. 2B continues the illustration of the process 200 and includes, at block 216, routing the request to join the meeting to the meeting-selection component based on the intent identified using NLU. At block 218, the meeting-selection component or another component of the remote system may identify the user making the request. As described above, this may include using an identifier associated with the device 102 from the which the device was obtained and mapping this identifier to a profile associated with the user. After identifying the user, the remote system 118 may access one or more calendars associated with the user at block 220 to identify any meetings at the current time for which the identified user is listed as a participant. That is, the remote system 118 may identify a time associated with the request and determine whether the user is listed as an invitee (or "participant") of one or more meetings at this time. Determining the time associated with the request may comprise discrete time at which the request was received (e.g., 10:06 am), a time range at which the request was received (e.g., between 10 am and 11 am), or the like. If the calendar(s) indicate that the user is a listed participant in a single meeting, then the remote system may proceed to cause the device 102 to join that meeting. In instances where the user is listed as a participant in multiple meetings, however, then at block 222 the meeting-selection component may select a meeting to join or suggest that the user join. As described above, this may include calculating a score for each identified meeting and joining or suggesting that the user join a meeting having a highest score. The score may be based on an array of criteria such as the number of invitees, the number of invitees that have accepted, declined or replied as tentative to the invitation, the topics of the respective meetings, the identities of the invitees, a length of the meeting, past behavior (e.g., meetings attended or skipped) by the user, or the like. In some instances, the user may configure the criteria to reflect preferences of the user. For example, the user may indicate that he or she wishes to always join a particular recurring meeting and each meeting associated with the keyword "hiring", while meetings relating to "training" are of less priority to the user. As used herein, a "topic" of a meeting may represent an item discussed in a meeting, as determined from analysis of a title of a meeting invitation, text in a body of the meeting invitation, or the like. In some instances, a topic may comprise a primary idea or theme of the meeting, as reflected by the title of the meeting invitation (e.g., "training", "design review", etc.). While the above example describes calculating a score for one or more meetings, in some instances a machine-learning model may be trained for determining a meeting to select. This model may use past behavior of the user and/or other users, such as which meetings the user(s) have attended, participated in, etc., to determine which meeting to join or recommend joining. In some instances, the machine-learning model may be tailored to the user 104, while in other instances the model may be associated with multiple users or an entire community.

Figure 2C:
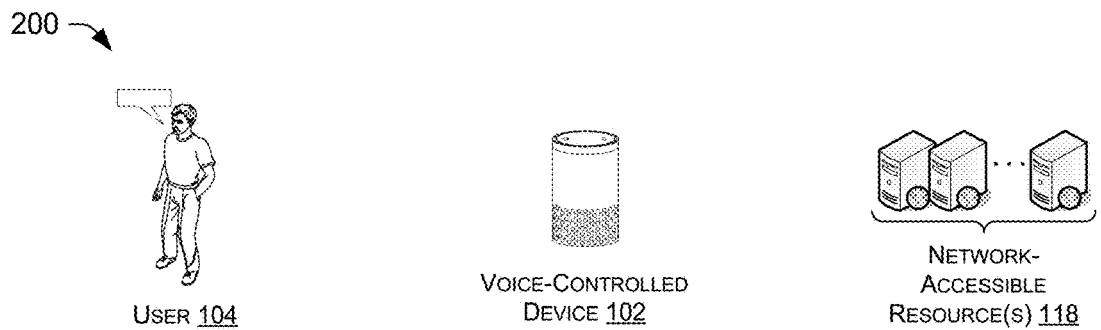
Figure 2C:
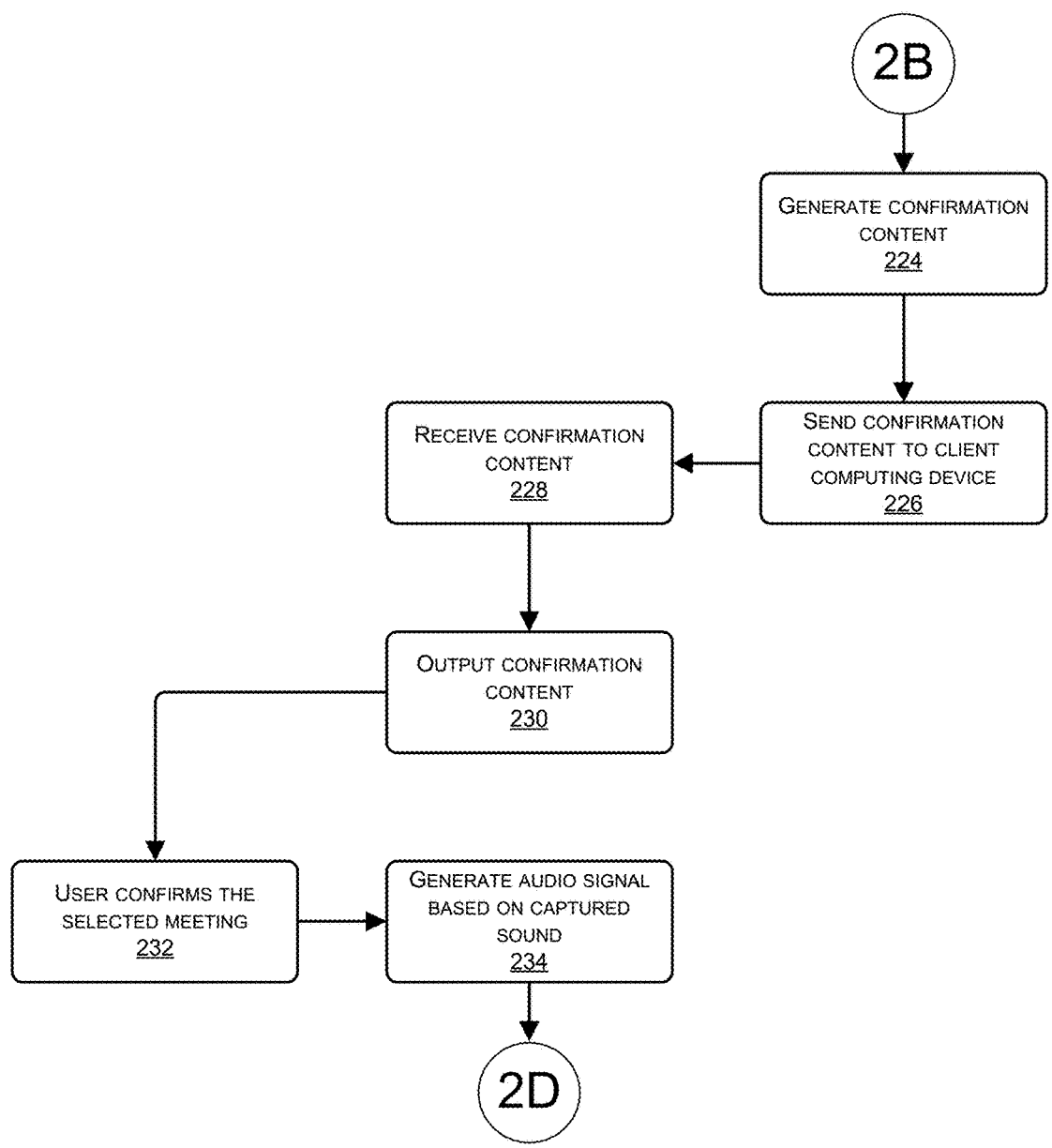

FIG. 2C continues the illustration of the process 200 and includes, at block 224, generating confirmation content for output to the user. This confirmation content may comprise audio data, video data, or any other type of data for requesting that the user confirm that the user would like to join the particular meeting selected by the remote system. Of course, in other instances the remote system may automatically instruct the device 102 to join the selected meeting without confirmation, as discussed above. At block 226, the remote system sends the confirmation content to the client computing device 102, which obtains the confirmation content at block 228. At block 230, the device 102 outputs the confirmation content, which in this example may comprise audio data for output by one or more speakers of the device 102. At block 232, in this example the user confirms that he or she would like to join the selected meeting. The user may make this confirmation audibly, via a GUI, or in any other manner. In this example, the user confirms the selection audibly and, thus, at block 234 the device 102 generates an audio signal representing the utterance of the user.

Figure 2D:
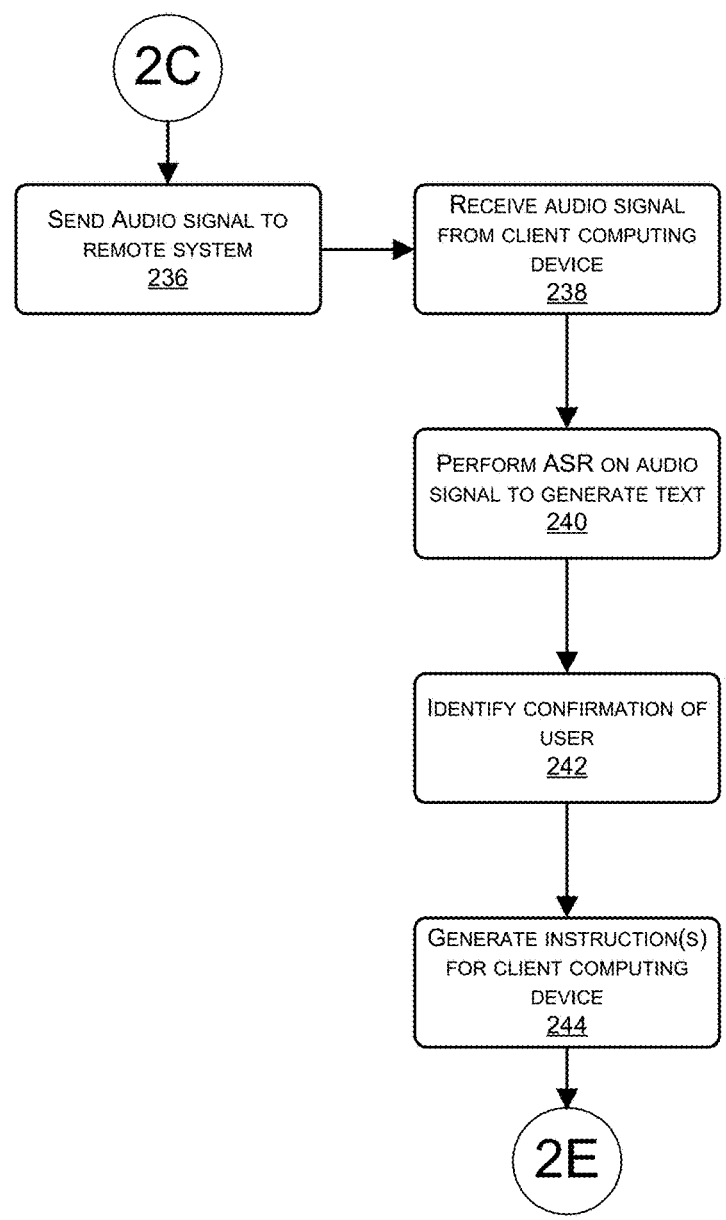

FIG. 2D continues the illustration and includes, at block 236, the device 102 sending the audio signal to the remote system 118, which obtains the audio signal at 238. At block 240, the remote system 118 performs ASR on the audio signal to generate text corresponding to the response of the user 104. At block 242, the remote system 118 identifies the confirmation of the user based on analysis of the generated text. At block 244, the remote system 118 generates instructions for causing the client computing device 102 to join the meeting by, for instance, generating a directive instructing the device 102 to call into a phone number associated with the selected meeting, as represented by the corresponding meeting invite.

Figure 2E:
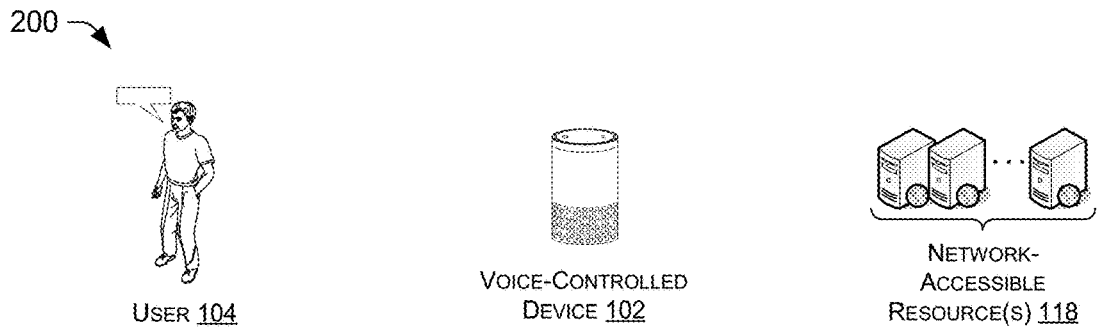
Figure 2E:
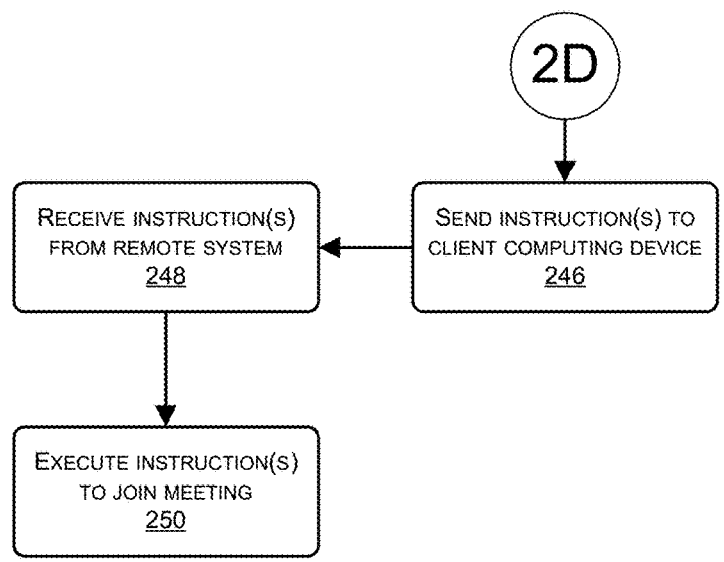

FIG. 2E concludes the illustration of the process 200 and includes, at block 246, sending the generated instructions to the device 102. The device 102 obtains the instructions at block 248 and executes the instructions at block 250. Thus, audio data from the environment of the user 104 is now sent to other device(s) connected to the meeting, while audio data from environment(s) of the other device(s) is sent to and output by the voice-controlled device 102 of the user 104.

Figure 3:
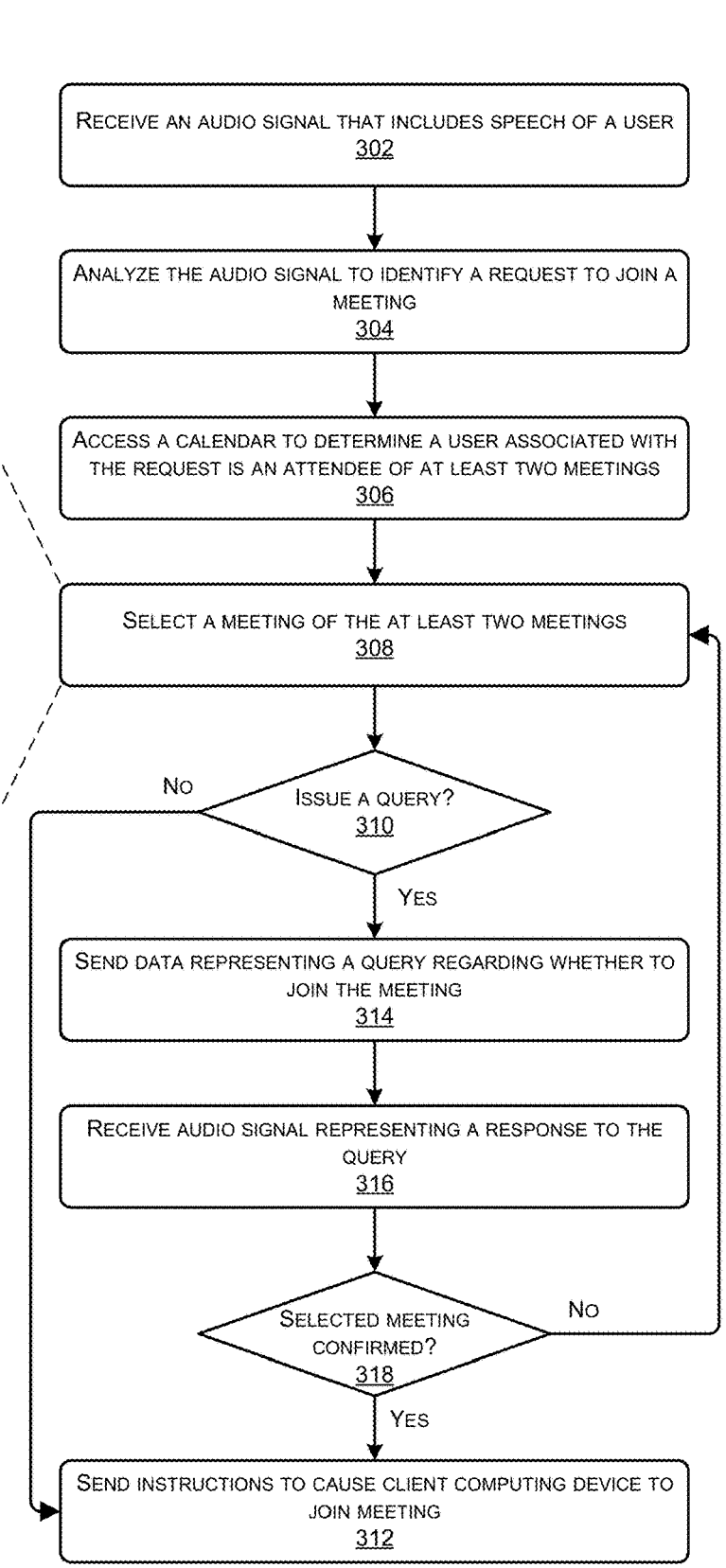
FIG. 3 illustrates a flow diagram of an example process for determining a meeting to join on behalf of a user and causing a client computing device to join the meeting.

FIG. 3 illustrates an example process 300 for selecting a meeting to join in response to obtaining a voice command from a user. In some instances, the process may be performed by the remote system 118, a client computing device such as the voice-controlled device 102, and/or a combination thereof. Further, while FIG. 3 describes techniques with reference voice commands, the techniques may apply equally to requests via any other means, as discussed above.

At block 302, the process includes obtaining an audio signal that includes speech of the user. At block 304, the audio signal is analyzed to identify a request to join a meeting. In some instances, this involves performing ASR on the audio signal to generate text, using NLU to identify an intent from the text, and thereafter routing the text to a speechlet associated with this intent. In this example, the text may be routed to a meeting-selection component configured to determine a meeting to join in response to a user issuing such a request.

At block 306, the process includes accessing a calendar associated with a user that made the request to identify any meetings at the current time for which the user associated with the request is listed as a participant. In this example, the process 300 identifies at least two such meetings and, thus, is to select one or more of the meetings to join on the user's behalf. At block 308, the process 300 selects a meeting to join based on one or more criteria, such as a number of invitees, the identity of the invitees, and/or any of the criteria laid out above. After selecting a meeting, block 310 represents determining whether or not to issue a query to the user to confirm the selection. For example, in some instances the process may calculate a confidence score associated with the determination of the selected meeting and, if the confidence score is above a threshold, may refrain from requesting confirmation but may instead proceed to cause the client computing device to join the meeting. The process 300 illustrates, for example, that if no query is to be output to the user, then at block 312 the process includes sending instructions for causing the client computing device to join the selected meeting to the client computing device.

If, however, a confirmation query is to be output, then at block 314 the process includes sending data representing a query regarding whether to join the selected meeting to the client computing device. At block 316, the process obtains an audio signal from the client computing device representing a response of the user to the query. At block 318, the process determines whether the response indicates that the user has confirmed the selected meeting. If so, then process proceeds to cause the client computing device to join the meeting at block 312. If not, then the process proceeds back to block 308 to select another meeting, such as the meeting associated with a second-highest calculated score.

Figure 4:
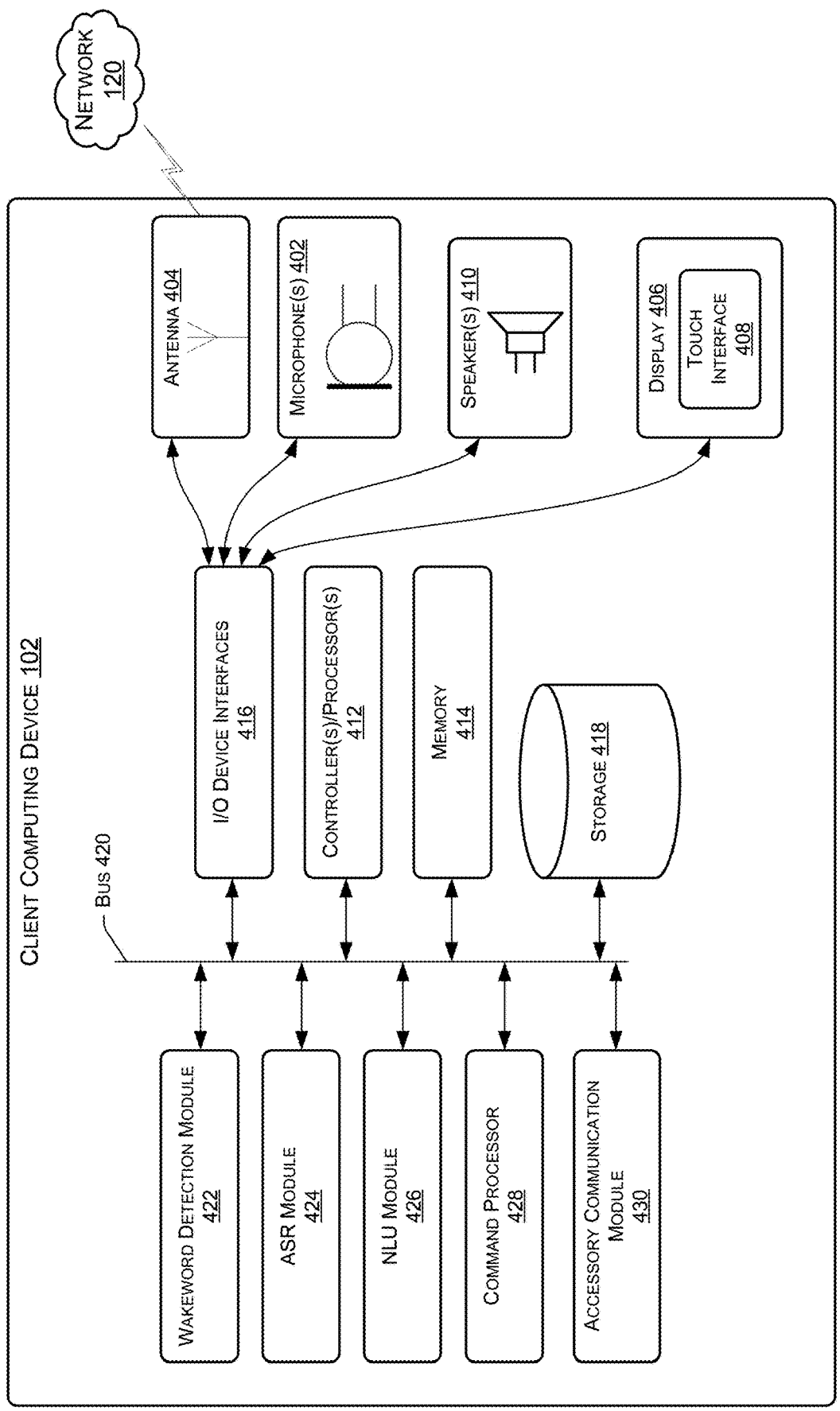
FIG. 4 illustrates a conceptual diagram of example components of a voice-controlled device, such as the voice-controlled device of FIG. 1.

FIG. 4 illustrates a conceptual diagram of example components of a client computing device, such as a voice-controlled device 102 of FIG. 1. The voice-controlled device 102 may be implemented as a standalone device 102 that is relatively simple in terms of functional capabilities with limited input/output components, memory, and processing capabilities. For instance, the voice-controlled device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 102. Nonetheless, the primary, and potentially only mode, of user interaction with the device 102 is through voice input and audible output. In some instances, the device 102 may simply comprise a microphone 402, a power source, and functionality for sending generated audio data via one or more antennas 404 to another device.

The voice-controlled device 102 may also be implemented as a more sophisticated computing device, such as a computing device similar to, or the same as, a smart phone or personal digital assistant. The device 102 may include a display 406 with a touch interface 408 and various buttons for providing input as well as additional functionality such as the ability to send and receive communications. Alternative implementations of the voice-controlled device 102 may also include configurations as a personal computer. The personal computer may include a keyboard, a mouse, a display 406, and other hardware or functionality that is found on a desktop, notebook, netbook, or other personal computing devices. In other examples, the voice-controlled device 102 may take the form of a portion of an automobile, a pin on a user's clothes, a mobile phone, or any other form factor. In examples, the voice-controlled device 102 may include speaker(s) 410. In other examples, the voice-controlled device 102 may not include speaker(s) 410 and may utilize speaker(s) of an external or peripheral device to output audio via the speaker(s) of the external/peripheral device. In this example, the voice-controlled device 102 might represent a set-top box (STB), and the device 102 may utilize speaker(s) of an accessory device, such as a television, that is connected to the STB for output of audio via the external speakers. In other examples, the voice-controlled device 102 may not include the microphone(s) 402, and instead, the voice-controlled device 102 can utilize microphone(s) of an external or peripheral device to capture audio and/or generate audio data. In this example, the voice-controlled device 102 may utilize microphone(s) of a headset that is coupled (wired or wirelessly) to the voice-controlled device 102. These types of devices are provided by way of example and are not intended to be limiting, as the techniques described in this disclosure may be used in essentially any device that has an ability to recognize speech input or other types of natural language input.

The device 102 may include one or more controllers/processors 412, which may include a central processing unit (CPU) for processing data and computer-readable instructions, and memory (or "computer-readable media") 414 for storing data and instructions of the device 102. The device 102 may also be connected to removable or external non-volatile memory and/or storage, such as a removable memory card, memory key drive, networked storage, etc., through one or more input/output device interfaces 416.

Computer instructions for operating the device 102 and its various components may be executed by the device's controller(s)/processor(s) 412, using the memory 414 as temporary "working" storage at runtime. A device's computer instructions may be stored in a non-transitory manner in non-volatile memory 414, storage 418, or an external device(s). Alternatively, some or all of the executable instructions may be embedded in hardware or firmware on the device 102 in addition to or instead of software.

The device 102 may include input/output device interfaces 416. A variety of components may be connected through the input/output device interfaces 416. Additionally, the device 102 may include an address/data bus 420 for conveying data among components of the device. Each component within the device 102 may also be directly connected to other components in addition to, or instead of, being connected to other components across the bus 420.

The device 102 may further include, in some instances, a display 406, which may comprise a touch interface 408. Any suitable display technology, such as liquid crystal display (LCD), organic light emitting diode (OLED), electrophoretic, and so on, may be utilized for the display 406. Furthermore, the processor(s) 412 may comprise graphics processors for driving animation and video output on the associated display 406, or the device 102 may be "headless" and may primarily rely on spoken commands for input. As a way of indicating to a user that a connection between another device has been opened, the device 102 may be configured with one or more visual indicators, such as the light source(s), which may be in the form of LED(s) or similar components, that may change color, flash, or otherwise provide visible light output on the device 102. The input/output device interfaces 416 may connect to a variety of components, such as a speaker 410 for outputting audio (e.g., audio corresponding to audio content, a text-to-speech (TTS) response, etc.), a wired or wireless headset, or other component capable of outputting audio. A wired or a wireless audio and/or video port may allow for input/output of audio/video to/from the device 102. The device 102 may also include an audio capture component. The audio capture component may be, for example, a microphone 402 or array of microphones, a wired or wireless headset, etc. The microphone 402 may be configured to capture audio. If an array of microphones is included, approximate distance to a sound's point of origin may be determined using acoustic localization based on time and amplitude differences between sounds captured by different microphones of the array. The device 102 (using microphone 402, wakeword detection module 422, ASR module 424, etc.) may be configured to generate audio data corresponding to captured audio. The device 102 (using input/output device interfaces 416, antenna 404, etc.) may also be configured to transmit the audio data to the remote system 118 for further processing or to process the data using internal components such as a wakeword detection module 422.

Via the antenna(s) 404, the input/output device interfaces 416 may connect to one or more networks 120 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 120, the speech processing system may be distributed across a networked environment. Accordingly, the device 102 and/or the remote system 118 may include an ASR module 424. The ASR module 424 of device 102 may be of limited or extended capabilities. The ASR module 424 may include language models stored in ASR model storage component, and an ASR module 424 that performs automatic speech recognition. If limited speech recognition is included, the ASR module 424 may be configured to identify a limited number of words, such as keywords detected by the device, whereas extended speech recognition may be configured to recognize a much larger range of words.

The device 102 and/or the remote system 118 may include a limited or extended NLU module 426. The NLU module 426 of device 102 may be of limited or extended capabilities. The NLU module 426 may comprise a name entity recognition module, an intent classification module and/or other components. The NLU module 426 may also include a stored knowledge base and/or entity library, or those storages may be separately located.

The device 102 and/or the remote system 118 may also include a command processor 428 that is configured to execute commands/functions associated with a spoken command as described herein. The device 102 may include a wakeword detection module 422, which may be a separate component or may be included in an ASR module 424. The wakeword detection module 422 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 5:
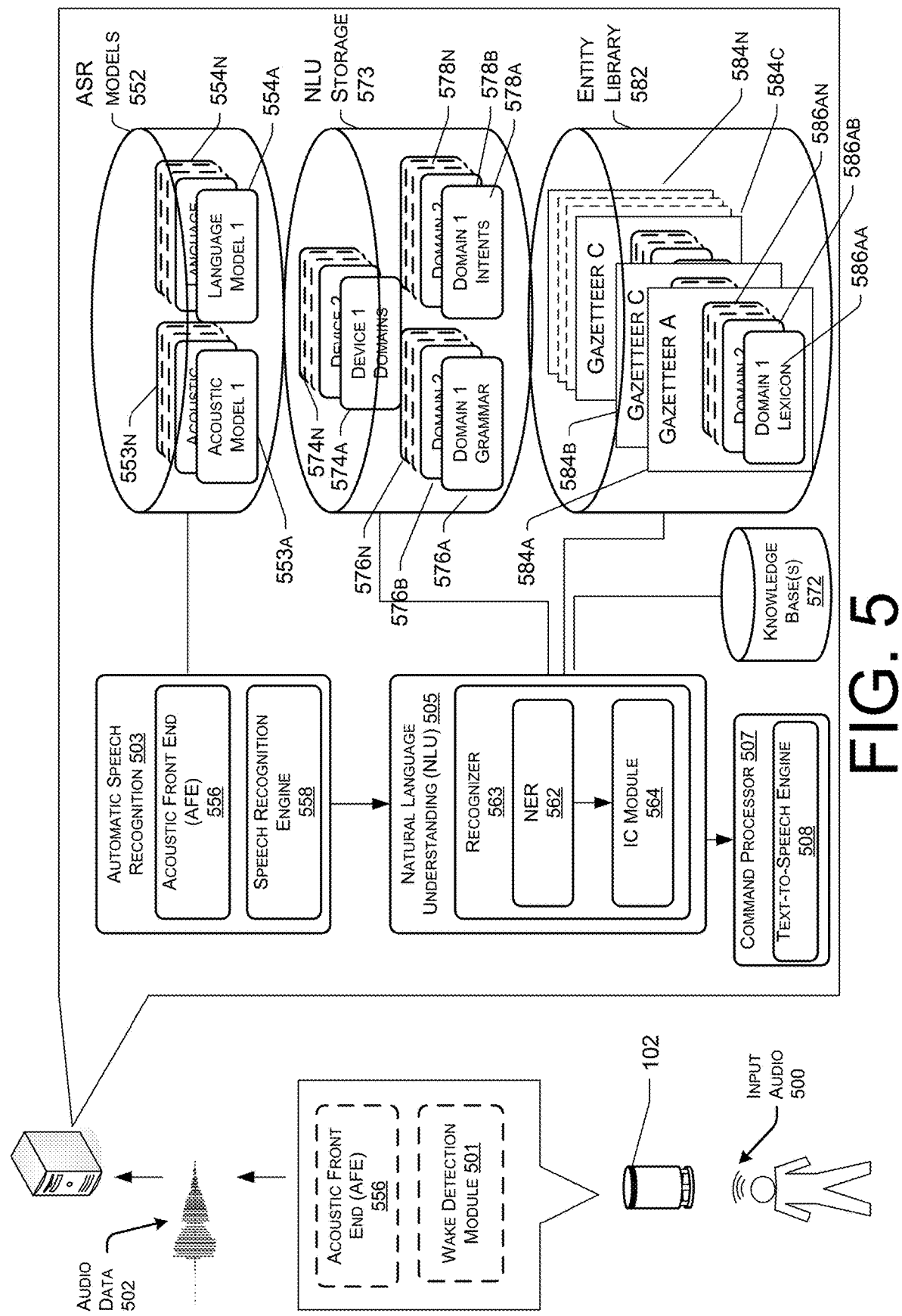
FIG. 5 illustrates a conceptual diagram of components of a speech processing system for processing audio data provided by one or more devices, such as the voice-controlled device of FIG. 1.

FIG. 5 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 118). The various components illustrated may be located on a same or different physical devices. Communication between various components illustrated in FIG. 5 may occur directly or across a network 120. An audio capture component, such as a microphone 112 of the device 102, or another device, captures audio 500 corresponding to a spoken utterance. The device 102, using a wakeword detection module 501, then processes audio data corresponding to the audio 500 to determine if a keyword (such as a wakeword) is detected in the audio data. Following detection of a wakeword, the device 102 sends audio data 502 corresponding to the utterance to the remote system 118 that includes an ASR module 503. The audio data 502 may be output from an optional acoustic front end (AFE) 556 located on the device prior to transmission. In other instances, the audio data 502 may be in a different form for processing by a remote AFE 556, such as the AFE 556 located with the ASR module 503 of the remote system 118.

The wakeword detection module 501 works in conjunction with other components of the user device, for example a microphone to detect keywords in audio 500. For example, the device may convert audio 500 into audio data, and process the audio data with the wakeword detection module 501 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 501 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 501 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 502 corresponding to input audio 500 to the remote system 118 for speech processing. Audio data corresponding to that audio may be sent to remote system 118 for routing to a recipient device or may be sent to the remote system 118 for speech processing for interpretation of the included speech (either for purposes of enabling voice-communications and/or for purposes of executing a command in the speech). The audio data 502 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 118, an ASR module 503 may convert the audio data 502 into text. The ASR transcribes audio data into text data representing the words of the speech contained in the audio data 502. The text data may then be used by other components for various purposes, such as executing system commands, inputting data, etc. A spoken utterance in the audio data is input to a processor configured to perform ASR which then interprets the utterance based on the similarity between the utterance and pre-established language models 554 stored in an ASR model knowledge base (ASR Models Storage 552). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 553 stored in an ASR Models Storage 552), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 503 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 556 and a speech recognition engine 558. The acoustic front end (AFE) 556 transforms the audio data from the microphone into data for processing by the speech recognition engine 558. The speech recognition engine 558 compares the speech recognition data with acoustic models 553, language models 554, and other data models and information for recognizing the speech conveyed in the audio data. The AFE 556 may reduce noise in the audio data and divide the digitized audio data into frames representing time intervals for which the AFE 556 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 558 may process the output from the AFE 556 with reference to information stored in speech/model storage (552). Alternatively, post front-end processed data (such as feature vectors) may be received by the device executing ASR processing from another source besides the internal AFE. For example, the user device may process audio data into feature vectors (for example using an on-device AFE 556) and transmit that information to a server across a network for ASR processing. Feature vectors may arrive at the remote system 118 encoded, in which case they may be decoded prior to processing by the processor executing the speech recognition engine 558.

The speech recognition engine 558 attempts to match received feature vectors to language phonemes and words as known in the stored acoustic models 553 and language models 554. The speech recognition engine 558 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, join my meeting" or "Alexa, join my meeting at 2 pm." The wake detection module may identify the wake word, otherwise described as a trigger expression, in this case "Alexa," in the user utterance, and may "wake" based on identifying the wake word. Audio data corresponding to the user utterance may be sent to the remote system 118, where the speech recognition engine 558 may identify, determine, and/or generate text data corresponding to the user utterance, here "join my meeting" or "join my meeting at 2 pm."

The speech recognition engine 558 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 558 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 118, for natural language understanding (NLU) processing, such as conversion of the text into commands for execution, either by the user device, by the remote system 118, or by another device (such as a server running a specific application like a search engine, etc.).

The device performing NLU processing 505 may include various components, including potentially dedicated processor(s), memory, storage, etc. As shown in FIG. 5, an NLU component 505 may include a recognizer 563 that includes a named entity recognition (NER) module 562 which is used to identify portions of query text that correspond to a named entity that may be recognizable by the system. A downstream process called named entity resolution links a text portion to a specific entity known to the system. To perform named entity resolution, the system may utilize gazetteer information (584a-584n) stored in entity library storage 582. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 503 based on the utterance input audio 500) and attempts to make a semantic interpretation of the text. That is, the NLU process determines the meaning behind the text based on the individual words and then implements that meaning. NLU processing 505 interprets a text string to derive an intent or a desired action from the user as well as the pertinent pieces of information in the text that allow a device (e.g., device 102) to complete that action. For example, if a spoken utterance is processed using ASR 503 and outputs the text "add music to the kitchen" the NLU process may determine that the user intended for the audio being output by a device also be output by another device associated with the identifier of kitchen.

The NLU may process several textual inputs related to the same utterance. For example, if the ASR 503 outputs N text segments (as part of an N-best list), the NLU may process all N outputs to obtain NLU results. As will be discussed further below, the NLU process may be configured to parse and tag to annotate text as part of NLU processing. For example, for the text "join my meeting at 2 pm," "join my meeting" may be tagged as a command and "at 2 pm" may be tagged as the value representing the time at which to execute the command.

To correctly perform NLU processing of speech input, an NLU process 505 may be configured to determine a "domain" of the utterance so as to determine and narrow down which services offered by the endpoint device (e.g., remote system 118 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 562 receives a query in the form of ASR results and attempts to identify relevant grammars and lexical information that may be used to construe meaning. To do so, the NLU module 505 may begin by identifying potential domains that may relate to the received query. The NLU storage 573 includes a database of devices (574a-574n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 563, language model and/or grammar database (576a-576n), a particular set of intents/actions (578a-578n), and a particular personalized lexicon (586). Each gazetteer (584a-584n) may include domain-indexed lexical information associated with a particular user and/or device. For example, the Gazetteer A (584a) includes domain-index lexical information 586aa to 586an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 564 parses the query to determine an intent or intents for each identified domain, where the intent corresponds to the action to be performed that is responsive to the query. Each domain is associated with a database (578a-578n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message,"

"send the following," or the like. The IC module 564 identifies potential intents for each identified domain by comparing words in the query to the words and phrases in the intents database 578. In some instances, the determination of an intent by the IC module 564 is performed using a set of rules or templates that are processed against the incoming text to identify a matching intent.

In order to generate a particular interpreted response, the NER 562 applies the grammar models and lexical information associated with the respective domain to actually recognize a mention of one or more entities in the text of the query. In this manner, the NER 562 identifies "slots" or values (i.e., particular words in query text) that may be needed for later command processing. Depending on the complexity of the NER 562, it may also label each slot with a type of varying levels of specificity (such as noun, place, city, artist name, song name, amount of time, timer number, or the like). Each grammar model 576 includes the names of entities (i.e., nouns) commonly found in speech about the particular domain (i.e., generic terms), whereas the lexical information 586 from the gazetteer 584 is personalized to the user(s) and/or the device. For instance, a grammar model associated with the shopping domain may include a database of words commonly used when people discuss shopping.

The intents identified by the IC module 564 are linked to domain-specific grammar frameworks (included in 576) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags.

For example, the NER module 562 may parse the query to identify words as subject, object, verb, preposition, etc., based on grammar rules and/or models, prior to recognizing named entities. The identified verb may be used by the IC module 564 to identify intent, which is then used by the NER module 562 to identify frameworks. A framework for the intent of "play a song," meanwhile, may specify a list of slots/fields applicable to play the identified "song" and any object modifier (e.g., specifying a music collection from which the song should be accessed) or the like. The NER module 562 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 562 may search the database of generic words associated with the domain (in the knowledge base 572). So, for instance, if the query was "set a timer for 600 seconds," after failing to determine the amount of time to set the timer for, the NER component 562 may search the domain vocabulary for the phrase "600 seconds." In the alternative, generic words may be checked before the gazetteer information, or both may be tried, potentially producing two different results.

The output data from the NLU processing (which may include tagged text, commands, etc.) may then be sent to a command processor 507. The destination command processor 507 may be determined based on the NLU output. For example, if the NLU output includes a command to send a message, the destination command processor 507 may be a message sending application, such as one located on the user device or in a message sending appliance, configured to execute a message sending command. If the NLU output includes a search request, the destination command processor 507 may include a search engine processor, such as one located on a search server, configured to execute a search command. After the appropriate command is generated based on the intent of the user, the command processor 507 may provide some or all of this information to a text-to-speech (TTS) engine 508. The TTS engine 508 may then generate an actual audio file for outputting the audio data determined by the command processor 507 (e.g., "joining your meeting now"). After generating the file (or "audio data"), the TTS engine 507 may provide this data back to the remote system 118 for sending the device 102.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 505 during runtime operations where NLU operations are performed on text (such as text output from an ASR component 503). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 563. Each recognizer may include various NLU components such as an NER component 562, IC module 564 and other components such as an entity resolver, or other components.

For example, a messaging domain recognizer 563-A (Domain A) may have an NER component 562-A that identifies what slots (i.e., portions of input text) may correspond to particular words relevant to that domain. The words may correspond to entities such as (for the messaging domain) a recipient. An NER component 562 may use a machine learning model, such as a domain specific conditional random field (CRF) to both identify the portions corresponding to an entity as well as identify what type of entity corresponds to the text portion. The messaging domain recognizer 563-A may also have its own intent classification (IC) component 564-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 118, as illustrated herein are exemplary, and may be located in a stand-alone device or may be included, in whole or in part, as a component of a larger device or system, may be distributed across a network or multiple devices connected by a network, etc.

While the foregoing disclosure is described with respect to the specific examples, it is to be understood that the scope of the disclosure is not limited to these specific examples. Since other modifications and changes varied to fit particular operating requirements and environments will be apparent to those skilled in the art, the disclosure is not considered limited to the example chosen for purposes of disclosure, and covers all changes and modifications which do not constitute departures from the true spirit and scope of this disclosure.

As used herein, a processor, such as processor(s) 112 and/or 124, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112 and/or 124 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 and/or 124 may possess its own local memory, which also may store program components, program data, and/or one or more operating systems.

The computer-readable media 114 and/or 126 may include volatile and nonvolatile memory, removable and non-removable media implemented in any method or technology for storage of information, such as computer-readable instructions, data structures, program component, or other data. Such computer-readable media 114 and/or 126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 114 and/or 126 may be implemented as computer-readable storage media ("CRSM"), which may be any available physical media accessible by the processor(s) 112 and/or 124 to execute instructions stored on the computer-readable media 114 and/or 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 114 and/or 126, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) may enable communications between the components and/or devices shown in architecture 100 and/or with one or more other remote systems, as well as other networked devices. Such network interface(s) may include one or more network interface controllers (NICs) or other types of transceiver devices to send and receive communications over the network 120.

For instance, each of the network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed, cause the one or more processors to:
obtain one or more first audio signals representing first sound captured by one or more microphones of a voice-controlled device in an environment, the first sound including first speech of a user in the environment;
perform automatic speech recognition (ASR) on the one or more first audio signals to generate first text representing the first speech of the user;
analyze the first text to identify a request to join a meeting using the voice-controlled device;
determine an identity of the user;
determine a time associated with the request;

access a calendar associated with the user;
determine, using the calendar, that the user is a participant in at least two meetings occurring at the time associated with the request;
select a first meeting of the at least two meetings for the voice-controlled device to join;
send, to the voice-controlled device, output audio representing a query as to whether the user would like to join the first meeting;
obtain one or more second audio signals representing second sound captured by the one or more microphones of the voice-controlled device, the second sound including second speech of the user;
perform ASR on the one or more second audio signals to generate second text representing to the second speech of the user;
analyze the second text to identify a confirmation that the user would like to join the first meeting; and
send one or more instructions to the voice-controlled device to cause the voice-controlled device to join the first meeting.

2. The system as recited in claim 1, wherein the computer-executable instructions further cause the one or more processors to:
determine a number of invitees in the first meeting; and
determine a number of invitees in a second meeting of the at least two meetings; and
determine that the first meeting has fewer invitees than the second meeting.

3. The system as recited in claim 1, wherein the computer-executable instructions further cause the one or more processors to:
determine that the user is an organizer of the first meeting; and
determine that the user is an invitee of a second meeting of the at least two meetings.

4. The system as recited in claim 1, wherein the computer-executable instructions further cause the one or more processors to:
determine, using the calendar, that information associated with the first meeting includes call-in information for joining the first meeting; and
determine, using the calendar, that information associated with the second meeting does not include call-in information for joining the second meeting.

5. The system as recited in claim 1, wherein the computer-executable instructions further cause the one or more processors to:
determine that the first meeting is a recurring meeting; and
determine that the user attended a previous instance of the recurring meeting.

6. A method comprising:
obtaining one or more first audio signals representing first sound captured by one or more microphones of a voice-controlled device in an environment, the first sound including first speech of a user in the environment;
performing automatic speech recognition (ASR) on the one or more first audio signals to generate first text representing the first speech of the user;
analyzing the first text to identify a request to join a meeting using the voice-controlled device;
determining an identity of the user;
determining a time associated with the request;
accessing a calendar of the user;
determining, using the calendar, that the user is an invitee of at least two meetings occurring at the time associated with the request;
selecting a first meeting of the at least two meetings for the voice-controlled device to join;
sending, to the voice-controlled device, output audio data representing a query as to whether the user would like to join the first meeting;
obtaining one or more second audio signals representing second sound captured by the one or more microphones of the voice-controlled device, the second sound including second speech of the user;
performing ASR on the one or more second audio signals to generate second text representing the second speech of the user;
analyzing the second text to identify a confirmation that the user would like to join the first meeting; and
sending one or more instructions to the voice-controlled device to cause the voice-controlled device to join the first meeting.

7. The method as recited in claim 6, further comprising:
determining an organizational chart associated with an employer of the user;
calculating, using the organizational chart, a first score associated with a first meeting of the at least two meetings; and
calculating, using the organizational chart, a second score associated with a second meeting of the at least two meetings;
and wherein the selecting comprises selecting the first meeting based at least in part on at least one of the first score or the second score.

8. The method as recited in claim 6, further comprising:
analyzing text associated with a first meeting of the at least two meetings; and
determining, based at least in part on the analyzing, that the text associated with the first meeting includes one or more keywords;
and wherein the selecting comprises selecting the first meeting based at least in part on the determining that the text associated with the first meeting includes the one or more keywords.

9. The method as recited in claim 6, further comprising:
determining that the user has been designated as a required participant of a first meeting of the at least two meetings; and
determining that the user has been designated as an optional participant of a second meeting of the at least two meetings;
and wherein the selecting comprises selecting the first meeting based at least in part on at least one of the determining that the user has been designated as a required participant of the first meeting or the determining that the user has been designated as an optional participant of the second meeting.

10. The method as recited in claim 6, further comprising:
determining a topic associated with a first meeting of the at least two meetings;
analyzing contents of one or more communications sent or received by the first user; and
determining, based on the analyzing of the contents of the one or more communications, that the topic associated with the first meeting is currently of interest to the user;
and wherein the selecting comprises selecting the first meeting based at least in part on the determining that the topic associated with the first meeting is currently more pertinent to the user than the topic associated with the second meeting.

11. The method as recited in claim 6, further comprising:
determining that a first meeting of the at least two meetings comprises a first recurring meeting;
determining that a second meeting of the at least two meetings comprises a second recurring meeting;
determining a first participation level of the user in a previous instance of the first recurring meeting;
determining a second participation level of the user in a previous instance of the second recurring meeting; and
determining that the first participation level is greater than the second participation level;
and wherein the selecting comprises selecting the first meeting based at least in part on the determining that the first participation level is greater than the second participation level.

12. The method as recited in claim 6, further comprising:
determining a first time at which an invitation for a first meeting of the at least two meetings was sent; and
determining a second time at which an invitation for a second meeting of the at least two meetings was sent;
determining at least one of that the first time is prior to the second time or that the first time is after the second time; and
and wherein the selecting comprises selecting the first meeting based at least in part on determining the at least one of that the first time is prior to the second time or that the first time is after the second time.

13. The method as recited in claim 6, further comprising:
determining that the user previously accepted an invitation associated with a first meeting of the at least two meetings;
determining that the user at least one of previously replied as tentative or declined an invitation associated with a second meeting of the at least two meetings or did not reply to the invitation associated with the second meeting;
and wherein the selecting comprises selecting the first meeting based at least in part on the determining that the user previously accepted the invitation associated with the first meeting and the determining that the user at least one of previously replied as tentative or declined or did not reply to the invitation associated with the second meeting.

14. The method as recited in claim 6, further comprising:
determining at least one of a number of invitees to a first meeting of the at least two meetings or a number of invitees that accepted an invitation to the first meeting; and
determining at least one of a number of invitees to a second meeting of the at least two meetings or a number of invitees that accepted an invitation to the second meeting;
and wherein the selecting comprises selecting the first meeting based at least in part on at least one of the number of invitees to the first meeting, the number of invitees that accepted the invitation to the first meeting, the number of invitees in the second meeting, or the number of invitees that accepted the invitation to the second meeting.

* * * * *